United States Patent [19]
Saigh et al.

[11] Patent Number: 5,734,823
[45] Date of Patent: Mar. 31, 1998

[54] SYSTEMS AND APPARATUS FOR ELECTRONIC COMMUNICATION AND STORAGE OF INFORMATION

[75] Inventors: Michael M. Saigh, St. Louis, Mo.; Edward H. Chang, Huntington Beach, Calif.; Douglas B. Brockhouse, Kirkwood, Mo.; Hsiao-Shih Chang, Orange County, Calif.

[73] Assignee: Microtome, Inc., St. Louis, Mo.

[21] Appl. No.: 687,292

[22] Filed: Jul. 25, 1996

Related U.S. Application Data

[63] Continuation of Ser. No. 367,056, Dec. 30, 1994, abandoned, which is a continuation-in-part of Ser. No. 296,120, Aug. 25, 1994, abandoned, which is a continuation-in-part of Ser. No. 787,536, Nov. 4, 1991, abandoned.

[51] Int. Cl.⁶ ............................................. G09G 1/00
[52] U.S. Cl. ............................. 395/200.06; 395/200.09
[58] Field of Search ...................... 395/200.06, 200.09

[56] References Cited

U.S. PATENT DOCUMENTS

| | | |
|---|---|---|
| 4,490,810 | 12/1984 | Hon . |
| 4,779,080 | 10/1988 | Coughlin et al. . |
| 4,855,725 | 8/1989 | Fernandez . |
| 4,899,292 | 2/1990 | Montagna et al. . |
| 5,065,345 | 11/1991 | Knowles et al. . |
| 5,121,492 | 6/1992 | Saville, III et al. . |
| 5,221,838 | 6/1993 | Gutman et al. ............... 235/379 |
| 5,388,196 | 2/1995 | Pajak et al. .................. 395/153 |

OTHER PUBLICATIONS

Watanabe et al. "Visual Interface for Retrieval of electronic formed Books"; IEEE Jul. 1993, pp. 692–695.

Pobiak; "Adjustable Access Electronic Books"; IEEE Jan. 1992; pp. 90–94.

Dvorak et al; "A Methodology for User Centred Link Structure for Textbook to Hypertext Conversion" IEEE Jan. 1992, pp. 619–628.

Now, Data By Satellite (no date).

This Little Computer Tries To Be A Book, St. Louis Post-Dispatch –Jan. 4, 1995.

IBM to Unveil Plan To Skip Disks, Send Software by Satellite, The Wall Street Journal –Nov. 1, 1994.

The Heller Report –Oct. 1993.

Electronic Campus, The Wall Street Journal –Jun. 1, 1993.

Making Book On Electronic Books, College Store Journal –Sep./Oct. 1992.

*Primary Examiner*—Krisna Lim
*Attorney, Agent, or Firm*—Armstrong, Teasdale, Schlafly & Davis

[57] ABSTRACT

An information distribution system, in accordance with one form of the present invention, includes a central information bank and a central transactional data base coupled to point-of-sale delivery systems. Information flows between each point-of-sale delivery system and the central information bank and central transactional data base via a communication network such as the telephone network, a satellite network, or any other network suitable for the transfer of information. The point-of-sale delivery systems may take one of many forms including a point of purchase delivery system, a point of rental delivery system, a "book bank" subsystem, a promotional delivery system, or any combination of such systems.

30 Claims, 11 Drawing Sheets

1

SYSTEMS AND APPARATUS FOR ELECTRONIC COMMUNICATION AND STORAGE OF INFORMATION

This application is a continuation of U.S. patent application Ser. No. 08/367,056 filed Dec. 30, 1994, now abandoned, which is a continuation-in-part of the U.S. patent Ser. No. 08/296,120 filed Aug. 25, 1994, now abandoned, which is a continuation-in-part of Ser. No. 07/787,536 filed Nov. 4, 1991, now abandoned.

FIELD OF THE INVENTION

The present invention relates to a system for distributing information in electronic form and more particularly, relates to a communication network for transmitting information between a central information bank and a user interface.

BACKGROUND OF THE INVENTION

With the current information publishing and distribution system, information usually is delivered as fixed printed images on paper or fixed in other media forms such as tapes, diskettes, cartridges, laser disk, or compact disk. Prior to and at various points in the delivery process, the information usually is warehoused. Eventually, the information is delivered to retail outlets scattered throughout a distribution territory. Upon receipt of the information, the retailers either store the information or display the materials for resale.

The present publishing and distribution system has many disadvantages. One disadvantage is the amount of time and labor required for preparing, printing, producing and distributing information. Another disadvantage of the current system is the lack of control over the production quantity of information, i.e., the number of copies made and sold. The current distribution system is further disadvantaged by the time, work and costs required in publishing and distributing information updates.

In an attempt to improve the dissemination of some types of information, bulletin board networks have been established. Networks, such as Internet, also have been or are being established. Known networks generally utilize a telephone network or some other network as a communication media and can be accessed using commercially available software and almost any type of computer. As presently operated, however, such networks are unsuitable for the distribution of proprietary information and information which is intended for limited copying. The free transfer of information using such networks provides little or no protection for copyright and proprietary information owners.

SUMMARY OF THE INVENTION

The present invention, in one aspect, is an information distribution system which overcomes disadvantages and shortcomings of the current information publishing and distribution system. An information distribution system, in accordance with one form of the present invention, includes a central information bank and a central transactional data base coupled to point-of-sale delivery systems. The central information bank and central transactional data base do not necessarily have to be co-located and can be implemented on different, but coupled, computer systems. Information flows between each point-of-sale delivery system and the central information bank and central transactional data base via a communication network such as the telephone network, a satellite network, or any other network suitable for the transfer of information.

More specifically, information obtained from publishers is digitized, i.e., convened to electronic form, to create a master copy in a uniform electronic format. Information obtained from publishers in digitized format simply is converted into the uniform electronic format. The master copies are stored in the central information bank.

The central transactional data base performs a record keeping function. Particularly, the transactional data base records and stores information related to each transaction performed at each point-of-sale site. Upon request, the transactional data base transmits sales data to a requesting publisher.

The point-of-sale delivery systems may take one of many forms including a point of purchase delivery system, a point of rental delivery system, a "book bank" subsystem, a promotional delivery system, or any combination of such systems. In the point of purchase delivery system, information is downloaded, i.e., copied, onto a user's storage media for later access by the user. The point of rental delivery system is similar to the point of purchase system except that in addition to downloading information, an automatic erasure time period designation is downloaded. As explained in more detail hereinafter, the time period designation is utilized so that upon expiration of the designated time, the downloaded information is automatically erased from the user's storage media. The book bank subsystem is a sub-network established between authorized users, such as employees of a corporation. Each user within the sub-network can access designated information stored within the sub-network. Such a configuration enables sharing of information. In the promotional delivery system, promotional and other commercial information can be accessed for viewing and ordering of products.

A most important element of each point-of-sale delivery system is the user interface, sometimes referred to herein as the "Book Bank". The term Book Bank, as used herein, refers to the interface between the network and the user. Although the term Book Bank may imply "book-type" material, such term is not so limited. The material may be of many types such as movies, music, video, audio, and computer software material.

The Book Bank is a self-service, user interactive information vending device. Each Book Bank contains a high volume, local memory storage having a customized portfolio of the most demanded information products for the particular site at which the Book Bank is located. Other information is transferred, via commercial communication networks (i.e. telephone networks, cable systems, satellite or cellular system or other similar communication networks), to a Book Bank for supplemental, secondary and less demanded purposes. A central processing unit contained within the Book Bank and coupled to the Book Bank local memory storage controls downloading and dynamic encryption of the information.

Widespread use of the present invention should greatly simplify, and reduce the costs associated with, the publication and distribution of information. Particularly, the present architecture reduces the amount of time and resources required for the distribution of information. Further, information updates can easily be made simply by updating the master copy stored in the central information bank and then either writing over the copies stored in each Book Bank with the updated master copy or downloading the updated master copy and storing both the old and updated versions in each Book Bank. Each Book Bank contains an electronic index of the various information titles accessible from the Book Bank. In addition, the number of production quantities of a particular work can be readily controlled using the central transactional data base to track the number of copies made and sold, within the network, for each work.

The present invention also readily enables controlling reproduction of information and greatly simplifies updating of text, and the dynamic encryption of text should provide copyright and proprietary information owners sufficient confidence in the present network to allow such information to be transmitted on the network.

BRIEF DESCRIPTION OF THE DRAWINGS

These and other objects and advantages of the present invention, together with further features and advantages thereof, will become apparent from the following detailed specification when read together with the accompanying drawings, in which:

FIG. 7 is a block diagram illustration of an end user's storage media;

DETAILED DESCRIPTION OF THE DRAWINGS

The following sections provide a brief overview of the present system and a detailed description of the system architecture. Following the detailed architecture description is a detailed description of point of sale delivery configurations. A detailed description of the various levels of encryption which may be used in the present system is then provided.

A. Brief Overview

In accordance with one embodiment of the present invention, information is distributed from a central information bank to a user's personalized storage medium. Information to be so distributed by the present system is received from outside sources either electronically, over various communication networks (e.g., telephone lines, cable systems, cellular systems or other similar commercial communication networks) or from various storage mediums (e.g., magnetic or electronic disks, cartridges, or tape reels or compact disks, laser disks, tape cassettes, etc.), or in hard copy format. If information is received in a hard copy format, it is initially converted to a standard digital format (e.g., ASCII text, DOS text or other similar standard commercially available text format) by scanning or direct transcription. Then the information is digitized, formatted, compressed and initially encrypted to form an electronic master copy which is stored in the central information bank. The master copy is duplicated electronically and dispatched electronically through a communication network, such as a telephone or satellite network, to a point-of-sale delivery system. Book Banks form a part of such a delivery system, and the electronic copies are retained in the Book Banks for downloading into user's personalized storage medium. Prior to and during downloading of the copy on the user's storage medium, the information is dynamically encrypted. A "dynamic" encryption process is utilized so that only the electronic reader associated with the user card used to access the information from the Book Bank and download the information to the user storage cartridge can be utilized to display the information in an understandable text format.

B. System Architecture

Figure 1:
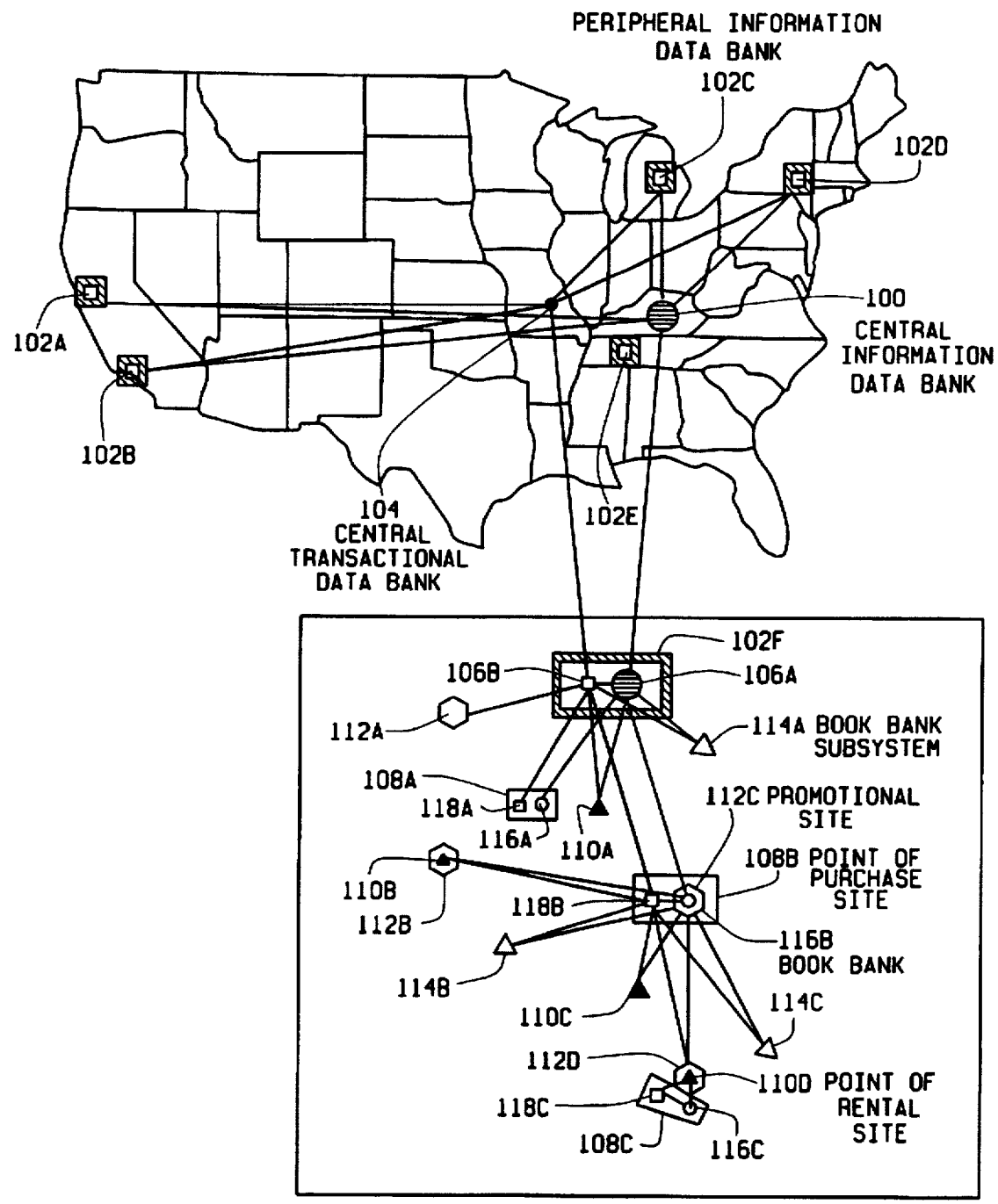
FIG. 1 illustrates one embodiment of the present information distribution system architecture.

FIG. 1 illustrates one embodiment of the present information distribution system. The system is shown, for illustration purposes only, as being implemented across the U.S.A. Referring to FIG. 1, a central information bank 100 is the central "library", or storage location, for information. Peripheral information banks 102A–F, coupled to central information bank 100, arc libraries, or storage locations, for community oriented information. For example, the information stored in central information bank 100 accessed most often from the San Francisco bay area peripheral information bank 102A may not be accessed often from the peripheral information bank for Memphis, Tenn. 102E. In any event, central information bank 100 is coupled to each peripheral information bank 102A–F to enable sharing of information. As explained in more detail hereinafter with respect to peripheral information bank 102F, each peripheral information bank 102A–F is coupled to one or more point-of-sale sites.

A central transactional data base 104, coupled to the central information bank 100 and the peripheral information banks 102A–F, serves a central record keeping function for central information bank 100 and peripheral information banks 102A–F. Central information bank 100 and central transactional data base 104 preferably are commercially available main frame computers, such as an IBM main frame computer. The particular main frame model selected depends on the amount of information to be centrally stored in the network, the extent of record keeping functions to be performed, and the speed at which transfer and processing of information is to occur. Importantly, the present invention is not limited to any one particular computer to serve as the central information bank and/or the central transactional data base.

As shown in FIG. 1 is an exploded view of the various couplings between central information bank 100 and transactional data base 104, peripheral information bank 102F and various point-of-sale delivery sites, particularly, point of purchase sites 108A–C, point of rental sites 110A–D, promotional sites 112A–D, and Book Bank subsystem sites 114A–C. Each point of purchase site 108 includes a point of purchase transactional database, represented by a box, and a user interface, represented by a circle. As explained above, the user interface is sometimes referred to herein as the "Book Bank". Specifically, point of purchase site 108A contains Book Bank 116A and transactional data base 118A, site 108B contains Book Bank 116B and transactional data base 118B, and site 108C contains Book Bank 116C and transactional data base 118C. Since the central information bank 100 and peripheral information bank 102F, and specifically peripheral information bank memory storage unit 106A, also could serve as Book Banks, such units are illustrated as circles. Further details regarding Book Banks and transactional data bases are provided below in Section C.

As illustrated in FIG. 1, each point-of-sale delivery system, such as systems 112A, 108A–B, 110A, and 114A–B, may be networked directly to peripheral information bank 102F, or the point-of-sale delivery system, such as systems 108C, 110B–D, 112B, 112D and 114B–C, may be networked to the point of purchase site 108B, which is networked to the peripheral information bank 102F. Point-of-sale delivery system configurations are explained in more detail below in Section C. At the level illustrated in FIG. 1, however, it is important to understand that the delivery systems may be integrated into various combinations, such as a promotional point of rental system as shown by 110B and 112B, or a promotional point of purchase system as shown by 108B and 112C, or a combination of a promotional, point of purchase, and point of rental systems as shown by 108C, 110D and 112D.

Communication network links between the central information bank 100, central transactional data base 104, peripheral information banks 102A–F, and point of sale sites can be made utilizing one or a combination of many commercially available networks such as telephone, satellite or cable networks or any other medium suitable for transmitting information in digitized format. Many well-known protocols could be used in connection with the present system. For example, if the InterNet is used as the "backbone" network, the well-known TCP/IP protocol could be used.

Figure 2:
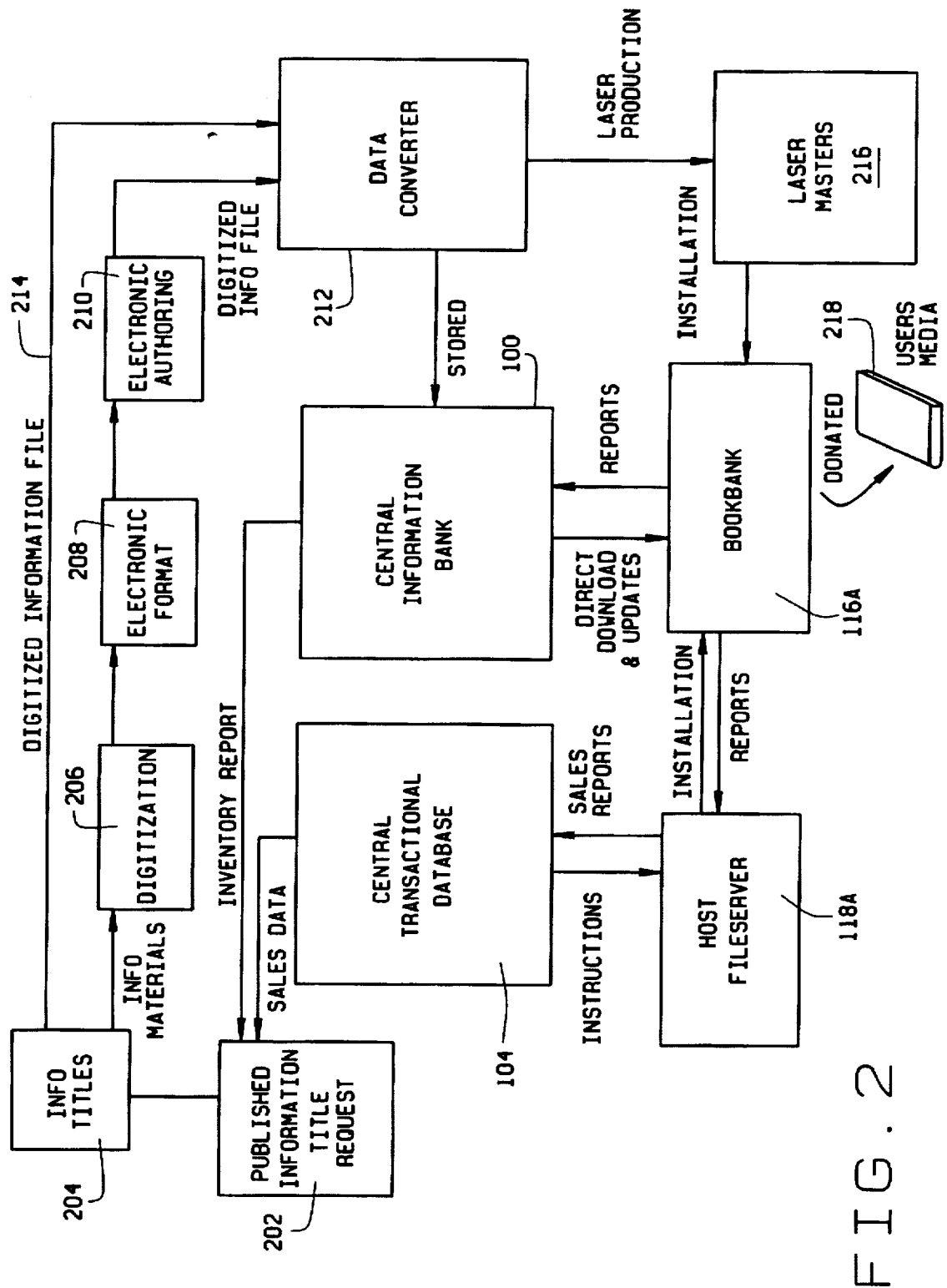
FIG. 2 illustrates information flow in the system architecture shown in FIG. 1.

FIG. 2 illustrates the flow of information in accordance with the embodiment of the system architecture illustrated in FIG. 1. For ease of illustration only, peripheral memory storage unit 106A is consolidated into central information bank 100, and peripheral transactional data base 106B is consolidated into central transactional data base 104. It should be understood, of course, that communication links between the peripheral information bank 102F and central information bank 100 and central transactional data base 104 are provided.

As illustrated by the inputs provided to block 202, a publisher will receive inventory reports from the central information bank 100 and sales data from central transactional data base 104. Based on this and other information, the publisher can determine whether to place additional information on the network. For ease of reference, such information is sometimes referred to herein as "information titles", as shown in block 204. If the information is not present in an electronic format, then the information is digitized 206, disposed in an electronic format 208 and then undergoes electronic authoring 210. The digitized information is then transmitted to a data converter 212 for converting the digitized information into a uniform format. For example, if the central information bank 104 and central transactional database 104 are DOS-based systems, the data converter will convert the information into a DOS format. If the information titles are in a digitized format, the information titles are transmitted directly to data converter 212 for direct conversion into the uniform format as illustrated by line 214.

Once the data is in a uniform, digitized format, it undergoes an initial encryption mad compression to both reduce the amount of storage space required to store the data and to make the data ready for being transmitted with less risk of unauthorized use while being transmitted through a communications network. The compression is accomplished through the use of one of the commercially available compression protocalls. The initial encryption is performed using one of the standard available encryption protocalls as discussed below in Section D.

Once in uniform, encrypted and digitized form, the information titles are stored in central information bank 100. An electronic index, listing all titles available and accessible by author, title, subject or ISBN codes is prepared. As new information titles are added, the electronic index is updated to include the new titles. The information titles may then be downloaded to Book Bank 116A. The information titles and corresponding electronic index information may, in addition to or rather than being stored in central information bank 100, be disposed on laser disk masters as illustrated at block 216. Laser disk masters 216 can then be installed directly into Book Bank 116A.

Prior to downloading desired information titles, the user may access an electronic index which contains all the information titles available for downloading from Book Bank 116A. Through the electronic index, the user obtains the listing for available information titles by author's name, by specific title of the work, by ISBN code or by subject matter. Once compiled, a listing of the available information titles included in the index category selected and the other necessary information to allow the user to purchase or rent any information title contained in the index category listed is displayed on the video screen. Using the video listing, the user selects any title listed thereon and obtains a print out of the relevant information through the printer slot 342. Upon proper access by a user, the information titles may then be downloaded from Book Bank 116A onto a user's storage media 218.

After downloading of information and corresponding electronic index information from central information bank 100 or installation of laser masters 216 to Book Bank 116A, inventory reports are generated by Book Bank 116A and transmitted to central information bank 100. These inventory reports reflect the information titles presently stored in Book Bank 116A. These reports are then are sent to publisher 202. Also, a download completion report is sent from Book Bank 116A to transactional data base 118A, sometimes referred to herein as a host fileserver, which in turn generates a status sales report. The sales report is transmitted to central transactional data base 104. Transactional data base 104 sends the necessary action instruction back to host fileserver 118A and a transaction report to publisher 202 for uses such as accounting and auditing.

For publishers who wish to allow a user to be able to produce a hard printed copy of a portion of a information title for study purposes, when the information titles are being downloaded into the master file, special authorization codes are included in the data. The codes accompany the information title to the cartridge of the user. The codes limit the particular amount of the information title which the user may produce in hard copy. With such coding in place, the user may print, from the cartridge, the allowable amount of text as a hard copy. The cartridge retains information relating to such printing and restricts further printing once the limits have been reached. The user determines the portion of the text to be produced as a hard copy by using the high lighting features of the reader programming to make a selection.

C. Point-of-Sale Delivery System Configurations

The point-of-sale delivery systems, as previously discussed, are classified by function. The functions include one or more of the following: (1) point of purchase delivery system, (2) point of rental delivery system, (3) book bank subsystem, and (4) promotional delivery system. The configurations for each of these functions are separately discussed in detail below.

1. Point of Purchase Delivery System

Figure 3:
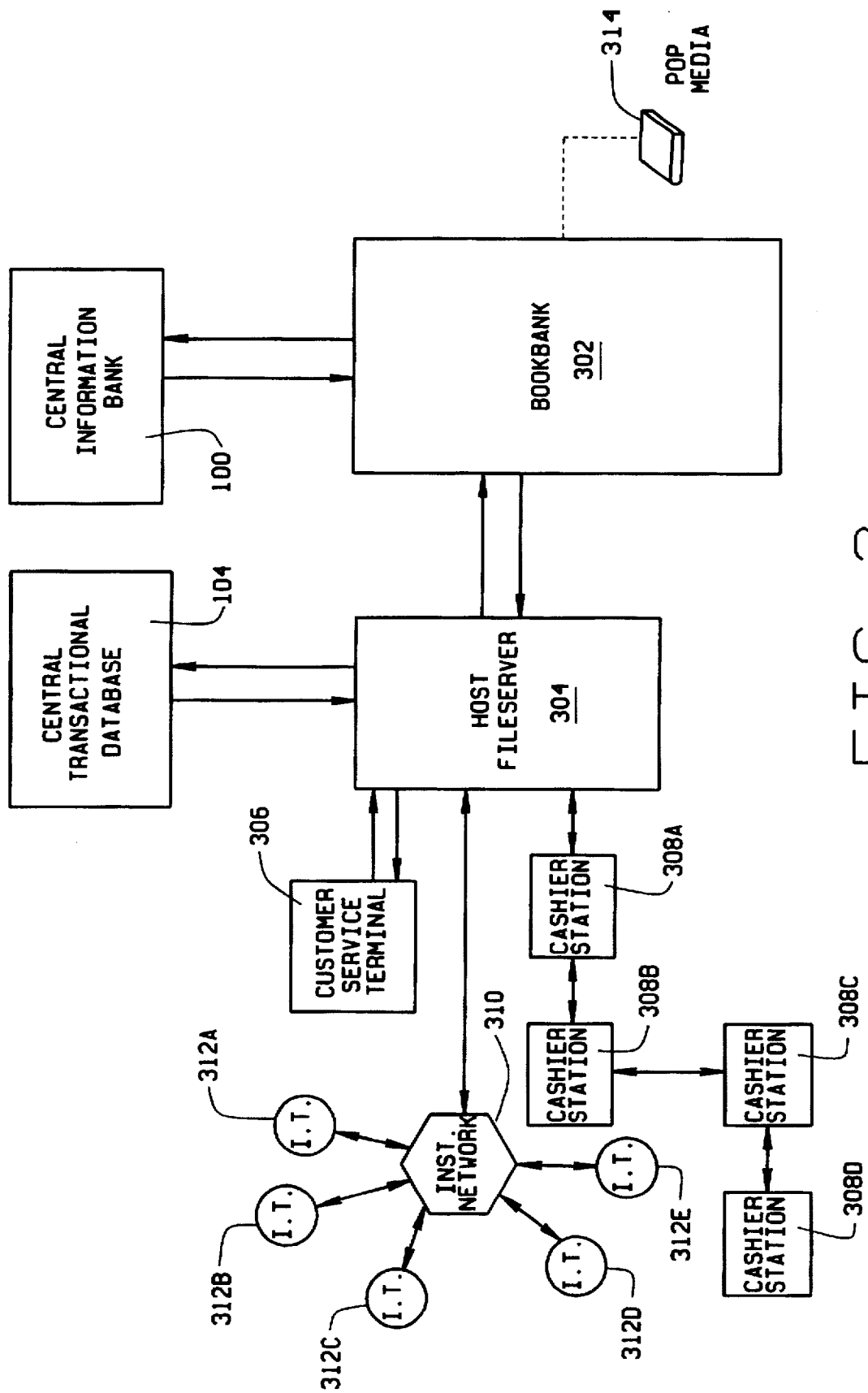
FIG. 3 is a block diagram illustration of a point of purchase delivery system.

A point of purchase system is illustrated in block form in FIG. 3. The point of purchase system is described herein for illustration purposes only as a system from which books can be purchased. As pointed out above, however, the system is not limited to books and other media capable of being expressed in electronic form such as computer software, music and video could be purchased utilizing the present system.

The point of purchase system illustrated in FIG. 3 includes a Book Bank 302 coupled to host fileserver 304. Server 304 is coupled to a customer service terminal 306 (of course, there could be more than one terminal) and a cashier's station 308A which is further interconnected to other cashier stations 308B–D. Server 304 also is coupled to an institution network 310 which in turn connects to institution terminals 312A–E. Service terminal 306, cashier stations 308A–D and institution network 310 are connected to server 304 via a computer communication link such as a commercially available computer networking system such as CompuServe or InterNet. Book Bank 302 and server 304 are connected to central information bank 100 and central transactional database 104 as hereinbefore explained with reference to FIGS. 1 and 2.

Cashier stations 308A–D are in serial, linear networking connections which allows the addition and removal of a number of cashier stations at any time. This configuration accommodates extra cashier stations required during rush seasons or rush hours and the desire to remove cashier stations for better utilization of space after the rush seasons. Customer service terminal 306 has local processing capability that provides customer services such as personal identification initiation, personal identification number changes, processing of complimentary books, book refunds, customer information entries and updates. The customer services terminal 306 can also provide the retail outlet with internal administration and the management functions, such as the book inventory cards management, the book list management, book requests, book reports, financial reports, and E-Mail and Bulletin Board management.

Figure 4:
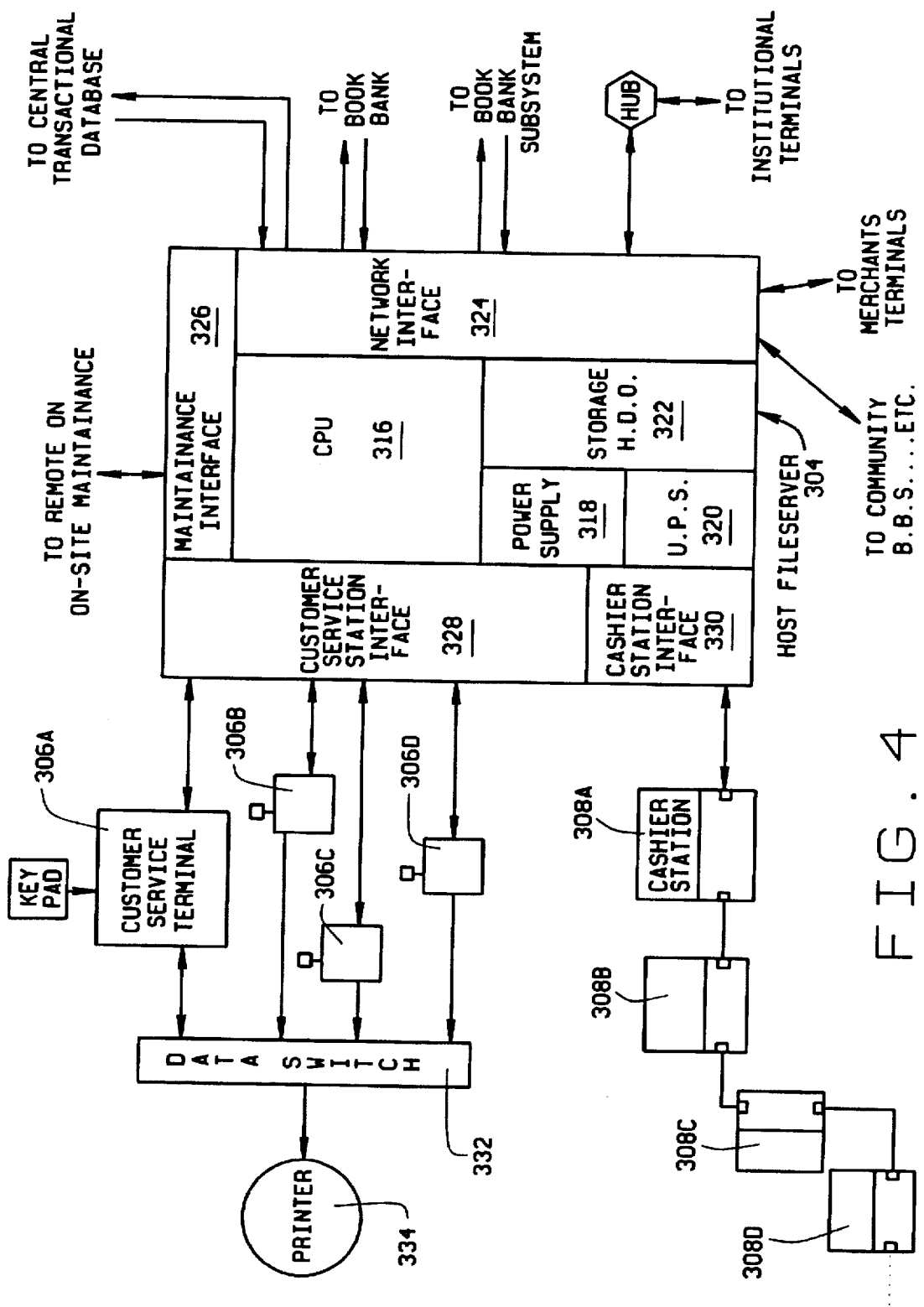
FIG. 4 is a more detailed block diagram illustration of the host fileserver shown in FIG. 3.

Referring now to FIG. 4, point of purchase fileserver 304 is shown in more detail. Particularly, server 304 includes a central processing unit (CPU) 316, a primary power supply 318, an uninterrupted power supply 320 to assure continuous operation during power failure, and a high density storage 322 that holds all the programs and the data bases required for server 304 operation.

Server 304 has four (4) interfaces, i.e., a network interface 324, a maintenance interface 326, a customer service station interface 328 and a cashier station interface 330. CPU 316 transmits instructions to Book Bank 302, creates transaction data bases and reports, and processes orders from cashier stations 308A–D and customer service terminals 306A–D.

From network interface 324, server 304 communicates with central transaction data base 104 for electronic filing of transaction reports, communicates with Book Bank 302 to give Book Bank 302 downloading instruction orders and to receive the status reports and the inventory reports from Book Bank 302. Server 304 also is coupled, through network interface 324, to a Book Bank subsystem to receive subsystem reports in order to give instructions and orders whenever necessary, as hereinafter discussed. External network systems such as institutional or corporate network systems with local merchants terminals, community bulletin board services and others can also be coupled to the network interface 324. The network interface 324 also allows two-way connecting with interbank networks such as Cirrus, Plus or other similar data transfer network. Coupling to merchants' terminals promotional system provides local merchants and the local business direct access to update their promotions and coupons. Maintenance interface 326 enables remote or on-site diagnosis and repair of server 304.

Customer service station interface 328 provides for communication between server 304 and customer service terminals 306A–D to handle customer service transactions. Customer service terminals 306A–D are illustrated as being coupled through a data switch 332 to a printer 334. Cashier station interface 330 provides that cashier stations 308A–D can communicate with server 304.

Figure 5:
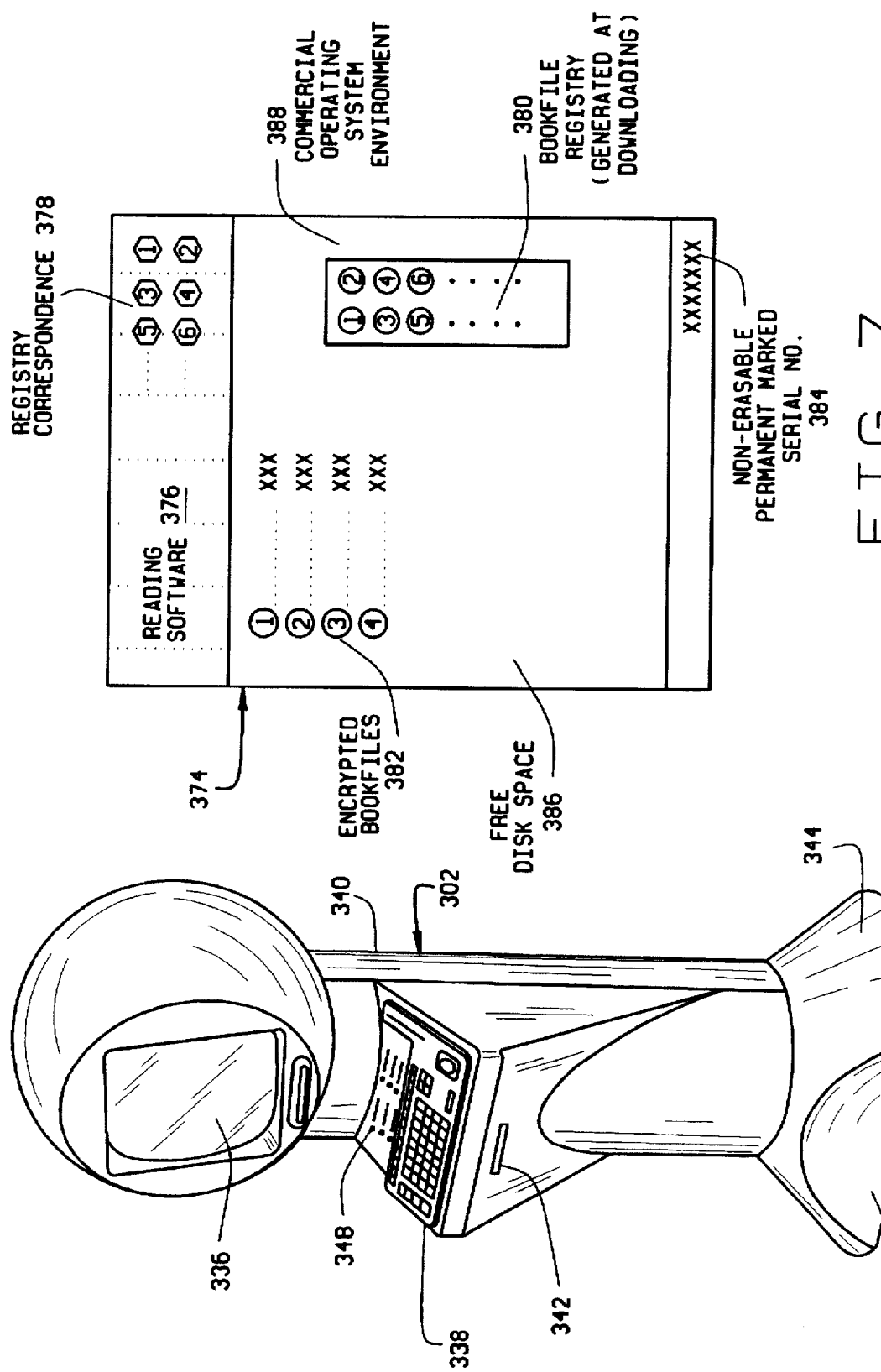
FIG. 5 is a perspective view of a Book Bank embodiment.

FIG. 5 illustrates one embodiment of Book Bank 302. Book Bank 302 includes a high resolution color graphic display 336 which is a touch screen device used to display, for example, instructions, messages, and status reports to the user, indexing information and to receive the user's touch screen input selections. Book Bank 302 also has a keypad 338 that is for the user to input a personal identification as well as other inputs. A magnetic code or other generally accepted card reader 341, shown as an insertion slot, is provided for customers' transactions with a bank card, credit card or some other form of debit card. A bar code reader 340, shown as an insertion slot, is provided to allow users to insert cards containing ISBN codes for desired information titles for reading by the Book Bank. ISBN codes may also be manually inserted by typing the relevant numbered keys on the keypad 338. A printer slot 342 also is provided to enable the user to access the output of Book Bank 302 printer (not shown in FIG. 5), as hereinafter described, to retrieve receipts and transactions reports and ISBN access vouchers. Book Bank 302 also includes a base member 344 with a cut-out portion 346 to enable a user to stand comfortably at keypad 338. Importantly, Book Bank 302 also includes a cartridge slot 348 for the user to input a reading cartridge, as explained in detail hereinafter, to obtain a copy of the information selected for downloading.

Figure 6:
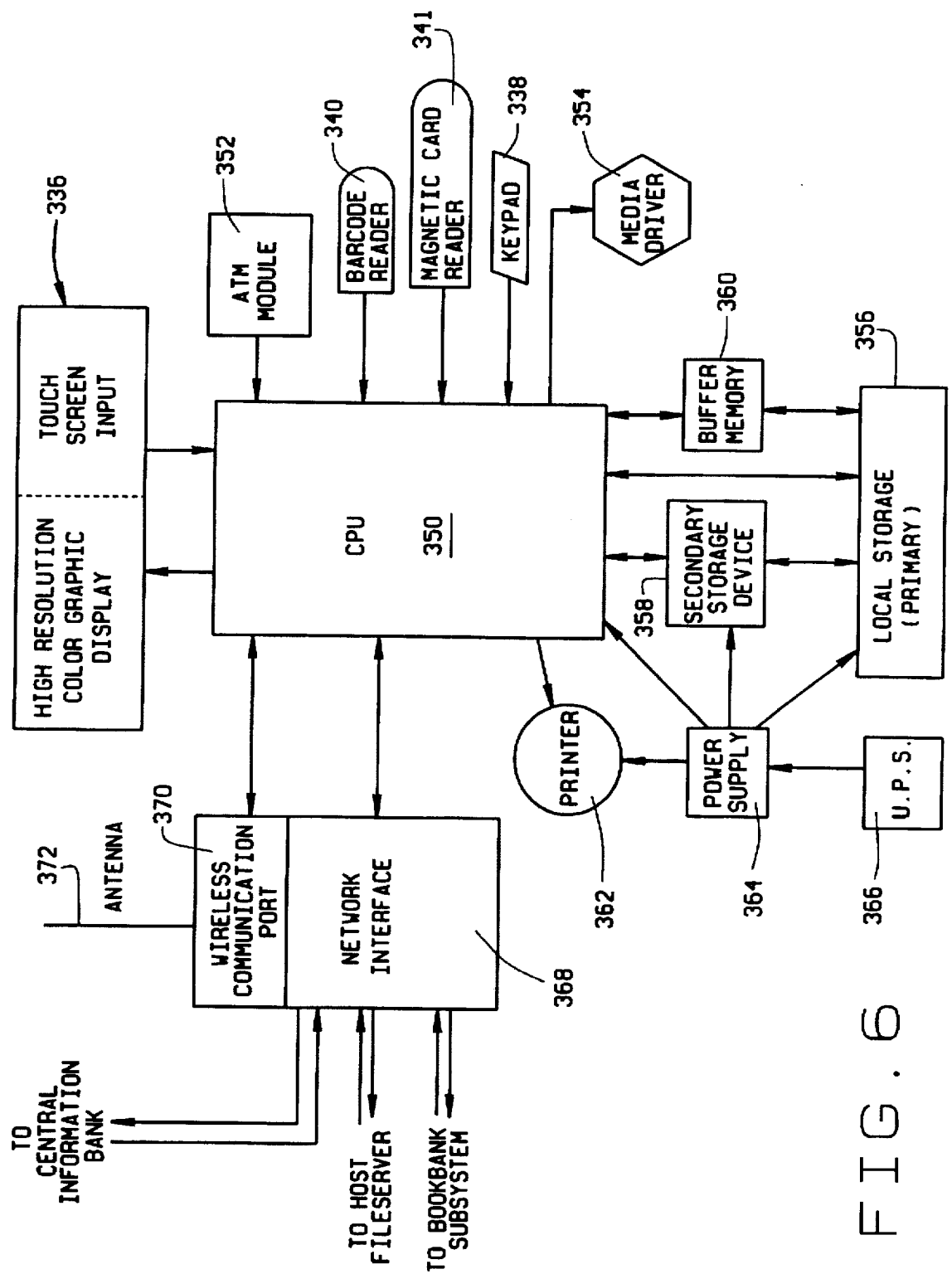
FIG. 6 is a block diagram illustration of the Book Bank circuitry.

FIG. 6 is a block diagram description of Book Bank 302 circuitry. Particularly, Book Bank 302 includes a central processing unit (CPU) 350 which is coupled to display 336, keypad 338, magnetic strip reader 341 and bar code reader 340. Although CPU 350 is illustrated as one unit, it is contemplated that CPU 350 could be a parallel processor or distributed processor arrangement. Selection of CPU 350 type depends, of course, on the amount of information to be processed, the desired speed of processing and costs. CPU 350 also is coupled to an automatic teller machine (ATM) module 352 to allow transactions with ATM cards. CPU 350 is coupled to a media driver 354 which enables users to insert personalized media for acknowledgment or other functions as hereinafter discussed. Book Bank 302 also includes a primary local storage device 356 provided for the storage of all information masters selected for loading into Book Bank 302 and related index information. A secondary storage device 358 is provided to hold other programs, instructions and transaction related information. A buffer memory 360 is utilized to speed up downloading in order to accommodate high volume users during the peak seasons. A printer 362 is provided to print coupons on demand, receipts and various reports for the users. A power supply 364 provides power to printer 362, CPU 350, secondary storage device 358 and local storage 356. An uninterrupted power supply 366 coupled to primary power supply 364 assures continuous operation even during power down time.

CPU 350 is coupled to a network interface 368 to provide communication to central information bank 100, host fileserver 304 or a Book Bank subsystem, as hereinafter discussed. CPU 350 also is coupled to a wireless communication port 370, which in turn is coupled to an antenna 372. Wireless communication port 370 enables compatibility with an alternative communication media in the event that such media is required.

FIG. 7 illustrates, in block diagram form, the structure for a user's personalized media storage cartridge 374. As explained hereinafter, a user inserts cartridge 374 into cartridge slot 348 for downloading of the information selected from Book Bank 302. The downloaded information is stored, in an encrypted format, on cartridge 374 together with relevant basic index information copied from the electronic index contained in Book Bank 202 at the time of initial downloading. Cartridge 374 is compatible with readers to enable the user to view information stored on the cartridge. Cartridge 374 includes reading software 376 which, as explained in more detail hereinafter, performs sequential encryption and decryption of information. Registry correspondence segment 378 also is provided. A book file registry 380 is created at the time of downloading information onto cartridge 374. Encrypted bookfiles 382 together with relevant electronic index information are stored on cartridge 374 as well as a non-erasable permanently marked serial number 384. Cartridge 374 also contains a commercial operating system environment 386 and free disk space 388.

Figure 8:
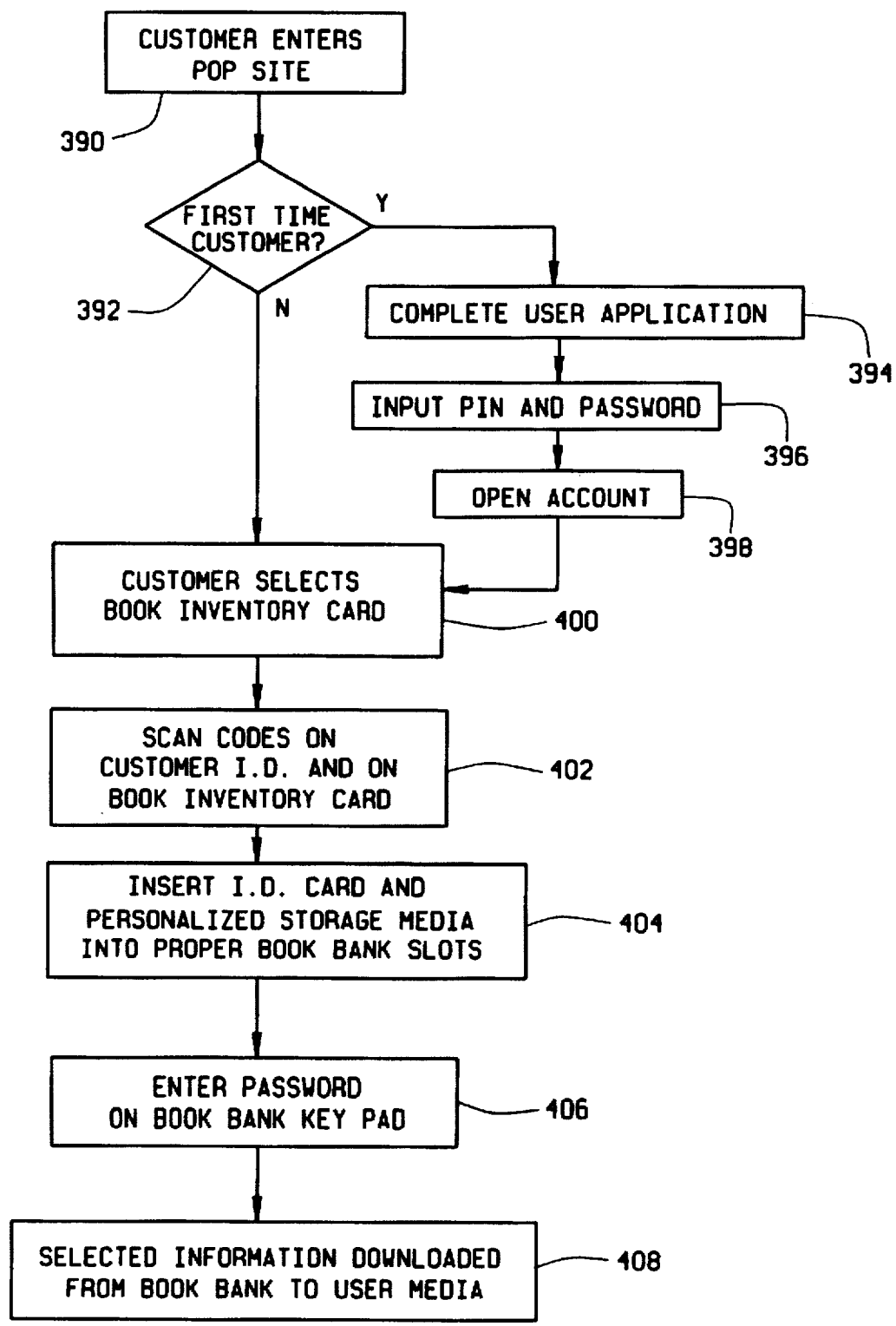
FIG. 8 illustrates the information flow for the point of purchase configuration.

FIG. 8 illustrates the user process and component processing which occurs when a user utilizes the point-of-purchase system described above. Particularly, once the user enters the site 390, and if the user a first-time patron 392, the user will complete a user's application form 394. The user will then take the completed application and a picture I.D. to customer service station 306A, where the user will select and input a personal identification number (PIN) and a password 396. The customer service clerk will open an account for the customer 398. The user selected password is automatically matched with a sequentially created customer account number within the central data banks. Using the keypad accompanying the cashier station, the clerk types in the name, address and social security number for the user. The written application will then be inserted into the printer slot accompanying the cashier station. While loading the customer information, the central data bank reviews the information to determine if there are any prior problems with the customer or other discrepancies. When the verification process is completed, the designated customer account number for the user is printed on the users application. Then, the clerk places, into the card slot, an user identification card (a plastic card having dimensions of the standard credit card and containing a magnetic strip on the back on which can be placed magnetic coded information). The card is then embossed with the user's name and account number and the magnetic strip is encoded with the applicable user codes (account number, card number and designated password information). The written application is then transmitted to the central data storage center for retention. The user now is able to use the issued card to make purchases or to rent the use of information titles. The machine used to emboss and encode the cards is a standard commercially available machine of the type currently being used in connection with the issuance of a bank cards, credit cards or debit cards.

In addition to obtaining a personal identification card, a new enrollee purchases a reader/computer or other acceptable reading device (such as a special computerized interface). Each such device is assigned a unique serial number and a special code number. The serial number is contained on a read only memory chip enclosed within the device. All of the many cartridges which accompany each such reading device is encoded in such a manner that information recorded on the cartridge can only be read by the related reading device. This is accomplished by a simple program contained within the permanent memory of the device. If the special code on the device is not the same as the number which the cartridge is seeking, then the cartridge will cause to be displayed in the reading device the words "cartridge cannot be read by this device" and to not allow any further access to any information contained on the cartridge by the particular reading device in question. If the numbers match, further access will be allowed. At the time a reading device is purchased, the clerk enters the serial number for the device into the central data bank through the cashiers station. The central data bank contains a list of the serial numbers of all approved reading devices and the corresponding special code number. The personal identification card for the customer purchasing the reading device is placed by the clerk into an appropriate slot on the cashier's station and the magnetic strip on the identification card is encoded with the applicable serial number for the reading device being purchased. Thereafter, whenever the user desires to obtain additional cartridges for reading by his or her reading device, the user need only present his personal identification card and the cartridge to be properly coded to the clerk and by inserting the cartridge into the cartridge slot and the identification card into the card slot and pressing the designated button on the cashiers station, the new cartridge will be correctly encoded to be readable by the user's reading device.

The requirement that reading device codes and cartridge codes match, before access will be allowed, means that issued cartridges will not be readily readable by multiple reading devices. Multiple device reading will require special programming and the granting of special allowances. The requirement reduces the possibility of unauthorized use of information titles.

The customer takes the customer identification card to the book display area for shopping 400. If the customer previously opened an account, the customer will not have to go through the above described process and can proceed directly to shopping area 400, where the customer will select a book inventory card matching his book selection. The book inventory card has the book ISB numbers, a bar code and information related to the particular information title, author, publisher, and edition date printed thereon. The customer brings the selected book inventory card to the cashier's station 308A. The cashier magnetically reads the codes on the customer's I.D. card and scans or manually enters the bar codes on book inventory cards 402. The customer then makes a proper payment, and the customer codes and information title bar codes are transmitted to host fileserver 304. Server 304 searches the existing customer account file to match the identification (i.e., pin and password) and will generate a downloaded book list file based on the bar codes from the book inventory cards or as manually loaded. Server 304 downloads the file to Book Bank 302 which electronically generates a portfolio of information titles ready to be downloaded on demand. The user can then proceed to Book Bank 302 at any later time and insert the identification card into the slot 340 of Book Bank 302 and a coded point-of-purchase cartridge 374 into Book Bank cartridge slot 348 to identify himself with a personal identification number, as illustrated in step 404. The user also enters a password 406 into the key pad 338.

When Book Bank CPU 350 matches the personal identification number with a downloaded list portfolio, Book Bank CPU 350 starts downloading the requested information from local storage 356, through buffer memory 360, to media driver 354 which copies the information onto cartridge 374. As part of the downloading process, the data is dynamically encrypted to make the data uniquely readable only by authorized reading devices. The dynamic encrypting is described below in Section D. After downloading, the user removes cartridge 374 and then inserts cartridge 374 into his personal reader/computer to access the information acquired. The reader/computers are configured for long-term reading applications. The reading application software is stored on cartridges with the ability to read the applicable software on the cartridges permanently stored within the memory of the reader/computers or other authorized reading device.

2. Point of Rental Delivery System

Figure 9:
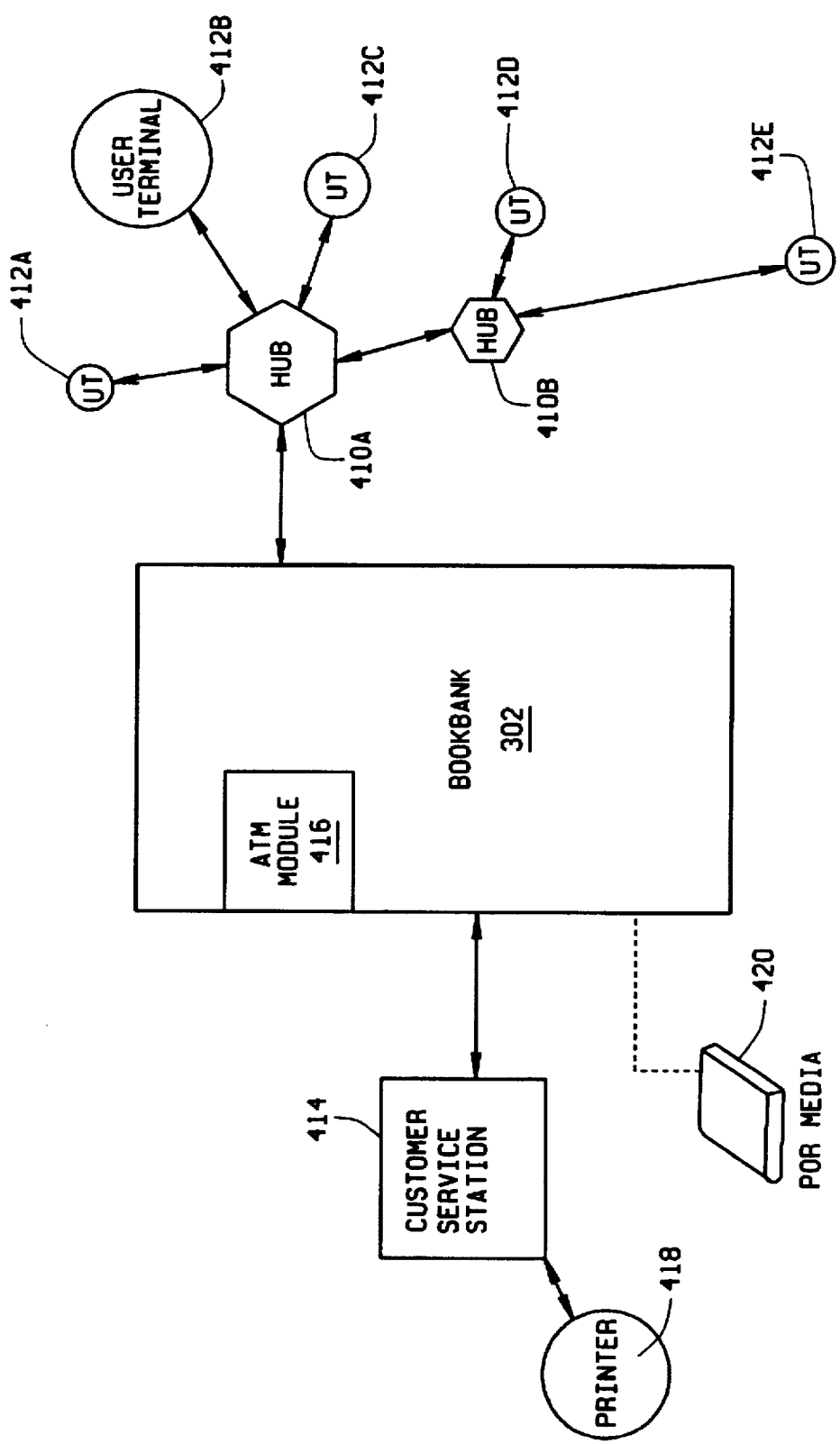
FIG. 9 is a block diagram illustration of certain elements of a point of rental delivery system.

If a user is not interested in obtaining a permanent copy of a particular work but requires a copy for a period of time, e.g., a semester, the user may prefer to visit a point of rental site rather than a point of purchase site. A point of rental system is illustrated in FIG. 9. The rental system is identical to the point of purchase system previously described herein (e.g., includes a host fileserver) except with respect to the differences pointed out below. In many instances, a single site or Book Bank may serve as a point of purchase system site and a point of rental system site and a point of delivery system for promotional or commercial information site or any combination thereof. As shown in FIG. 9, the point of rental system includes Book Bank user terminal hubs 410A–B coupled to terminals 412A–E, and customer service station 414. User terminals 412A–E allow a customer to do an information title search and index search of the Book Bank memory and to transmit other information between Book Bank 302 and himself. Customer service station 414 combines the function of customer service as well as the cashier's station. For example, at customer service station 414, a credit customers' debit card can be credited and the ATM operation can be overridden, via ATM module 416, if necessary. Information can be printed out from customer service station 414 via printer 418.

Point of rental storage media 420 is used in the rental system. Point of rental media 420 is the same as point of purchase media 374 except that media 420 includes an automatic erasure mechanism that erases the information downloaded after the expiration of a preset time interval. More specifically, when information is downloaded from Book Bank 302 onto media 420, Book Bank 302 also downloads a "time stamp" equal to the time period for which the user has paid to retain a copy of the information. The time stamp could take the form of a value loaded into a memory location on media 420, which value corresponds to the rental time period. During usage, the actual usage time elapsed is subtracted from the electronically stamped time period. Once the user has consumed all of the usage hours authorized, the information title will self-destruct, i.e., be deleted, from media 420. This can be achieved simply by calling a stored program which erases the information associated with the memory location where the time value is stored. For example, when the value of the memory location where the authorized usage time is stored is zero, the stored erase program would be called upon to erase the information associated with the "zero" time usage authorization.

Another method for automatic erasure is for each rental or library cartridge to contain a real time clock and independent rechargeable power supply. When the cartridge is initially encoded for use, the real time clock mechanism is activated. As rented information titles are being downloaded, an expiration date is logged into the index information for each title. Any time after the real time clock on the cartridge reaches the designated expiration date, access to the relevant information title is denied. If use of the title is not extended, after the expiration of an additional number of days, use of the cartridge will cause a permanent erasure of the information title from the cartridge memory. With this method, if the real time clock fails to operate, the cartridge will become unreadable without repair. To repair a defective cartridge, the user need only bring the cartridge together with his personal identification card to the nearest service center where the real time clock will either be repaired or the relevant information titles will be loaded onto a replacement cartridge. The user will be credited for any lost time while the cartridge was unreadable. A service center could be located, for example, near each separate point of delivery site.

The automatic erasure program could be created as an operating system module or as a separate executable program designed to be "terminate and stay resident" (TAR). A module integral with the operating system is preferred since such a structure ensures that if the operating system is viable, the automatic erasure module is viable.

If the user still needs more time with any particular information titles, the user may return to the point of rental site and "re-rent" the information. Alternatively, it is contemplated that the user could renew the rental via a modem coupled to the reader.

With respect to the user process for renting information, when a point of rental patron enters a point of rental site, the user will use a valid ATM card, bank card, credit card, or some other debit card and proceed directly to a user terminal 412A–E. Using such a terminal, the user can perform information title searching and download an order entry to Book Bank 302. When the download entry is complete, the user will go to Book Bank 302, insert a rental media, an identification card, and a credit card, bank card, or debit card into Book Bank 302 for the transaction approval. If the transaction is not cleared or if the ATM system is not working properly, the patron can proceed to the customer service center and have the attendant manually override the ATM process, if appropriate. If the user does not have a valid ATM credit card or debit card, the user will go to the customer service center, pay the service clerk to receive credit on the Book Bank debit card. Then the customer may proceed to the user terminal where the user downloads the order entry.

After the transaction approval is cleared, the patron inserts point of rental media 420 into Book Bank media driver 354, has his personal identification card scanned and enters a password. The information is dynamically encrypted and downloaded from Book Bank 302 to media 420 with an electronic stamp of the number of hours of usage authorized for each information title or an expiration date. After the downloading, the user will apply this media on the personal reader/computer to access the information on the media.

Typical examples for the point of rental site are libraries (commercial, education or public access) and book rental shops. The information downloaded by the user may be free of charge to the users such as in the case of a library, or may incur certain rental fees at a pre-determined rate, such as in the case of a rental shop or library charging on a per page use basis. Any given point of rental site may operate as a traditional library in allowing free use to library members for a limited period of time or may operate as a rental shop where fees are collected from users in accordance with the period of use allowed.

3. Book Bank Subsystem

A Book Bank subsystem couples to a Book Bank and host fileserver as described in more detail below. The central element of the subsystem is a Book Bank which is a modified version of the point-of-purchase Book Bank 302. The subsystem is specifically configured for the collective use by members or the staff of a commercial or business entity or a corporation. It delivers and it recalls information titles among authorized users within the business or corporate entity, and provides the capability of limiting the number of copies of a given work that may be distributed to other authorized users. If all of the licensed copies of any information titles have been checked out by the staff of an organization, then no other users may access the same information title within that particular subsystem until one or more of the licensed copies of the particular information is uploaded or recalled to the subsystem or additional copies are purchased.

Instead of purchasing the unlimited use of a limited number of copies, a commercial or business entity may lease the limited use of an unlimited number of copies or the use of a specified portion of a given information title. Under such circumstances, the commercial or business entity would be charged each time the subsystem is accessed from a participating work station for the portion of a specified information titled accessed and for the period of time the access occurs. By restrictions encoded on the interface between a participating work station and the subsystem, while accessing information from the subsystem, the ability of the work station to perform certain operations would be restricted. The restricted operations would be those related to the duplication or transmission of data related to information titles being accessed through the subsystem.

Figure 10:
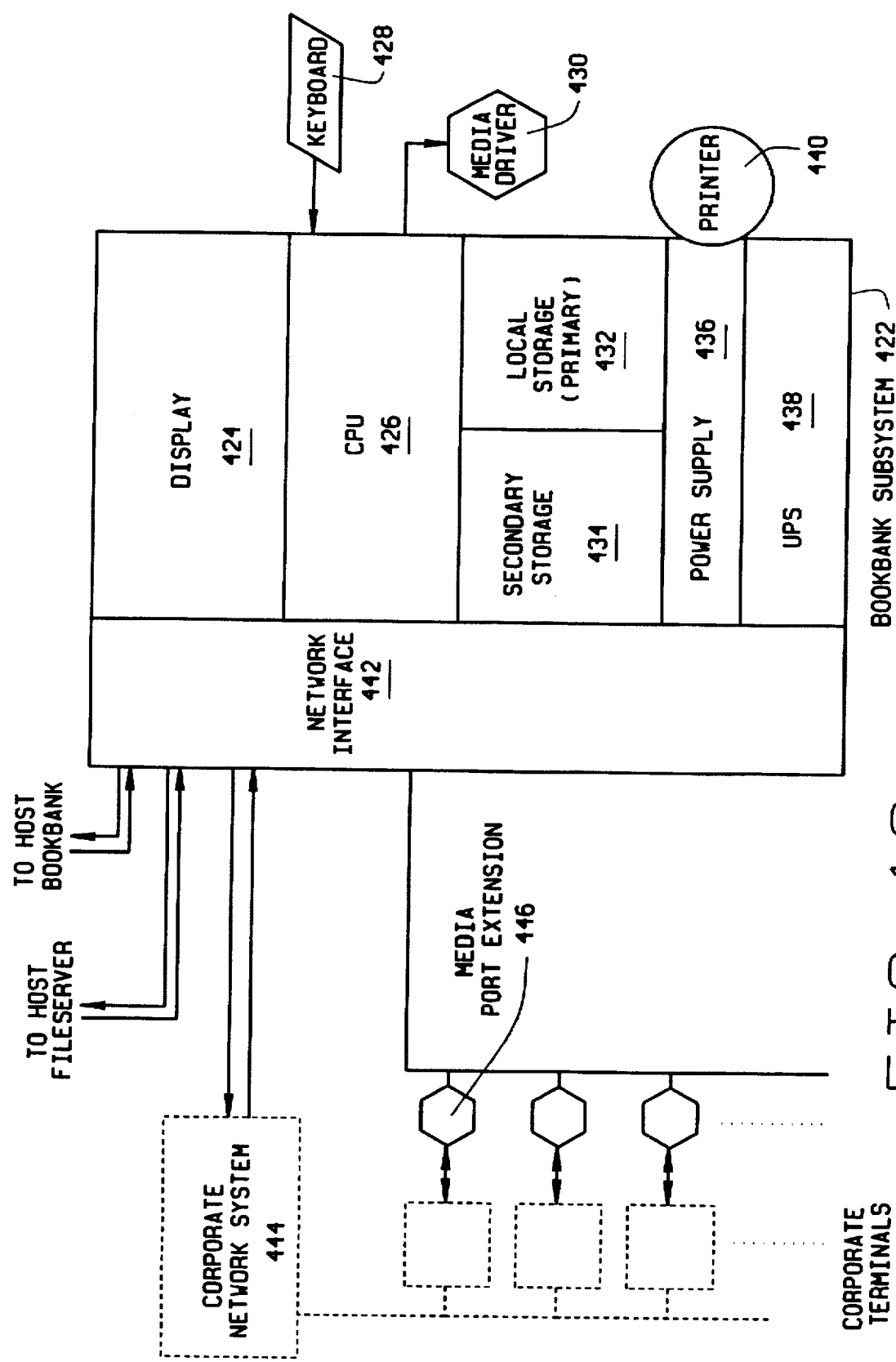
FIG. 10 is a block diagram illustration of certain elements of a Book Bank subsystem.

More specifically, and referring to FIG. 10, Book Bank subsystem 422 contains a high resolution color graphic display 424 coupled to CPU 426 to display the instructions or status of subsystem 422. Subsystem 422 also includes a keyboard 428 with limited access to the system for keying selections for operating certain given functions such as product display. Subsystem 422 has a media driver 430 for the downloading of information and a local storage 432 which holds a portfolio of information the business entity has ordered for use. A secondary storage 434 is also provided to hold all the software programs that control and perform the functions of subsystem 422. Subsystem 422 further includes a power supply 436 and an uninterrupted power supply 438 to assure continuous operation during power failure downtime. A printer 440 is provided to print various reports.

Book Bank subsystem 422 has a network interface 442 that connects subsystem 422 to Book Bank 302 and host fileserver 304. Network interface 442 also may couple to the corporate or business entity network system 444. With such a structure, the corporate entity may transmit or download its own corporate proprietary information through Book Bank subsystem 422.

Media port extension interface 446 provides access by an adequate number of media drivers to the desired corporate terminals for corporate network stations. Media driver 430 is connected to the terminals or stations by a proprietary driver card. The corporate administration can utilize the dynamic encryption and the dynamic downloading function of Book Bank subsystem 422 to incorporate and accommodate the corporate proprietary information. The corporate proprietary information may be transmitted to Book Bank subsystem 422 using an encryption process and then downloaded selectively to the destination port and to the properly identified authorized personnel. Book Bank subsystem 422 is not only a customized corporate library of copyrighted and proprietary information, but also is a corporate document security device that encrypts and dispatches the corporate documents and the corporate confidential proprietary information in the corporate network system. As part of the network interface connection linking each participating work station to the subsystem and allowing access to encrypted information, a separate unit, e.g., a memory storage unit, restricts certain operations which may be performed from the work station so long as the work station has access to encrypted information from the subsystem. The restrictions limit or prevent operations related to the duplication or transmission of data.

4. Promotional Delivery System

The promotional system is a point of delivery system for promotional and commercial information. It distributes promotional and commercial information in electronic format and users may either view the digitized promotional and commercial information at the site or download the information to their personalized media for later viewing. User's can access the promotional and commercial information including the dynamic viewing electronically of advertising, available discounts, commercials, special promotional events, software demos and product catalogs. Users may even shop electronically by manipulating the promotional and commercial information and placing orders through E-Mail from a personal reader/computer or by ordering directly from an interactive promotional Book Bank. The promotional Book Bank has the same structure as Book Bank 302 for the point-of-purchase system.

Figure 11:
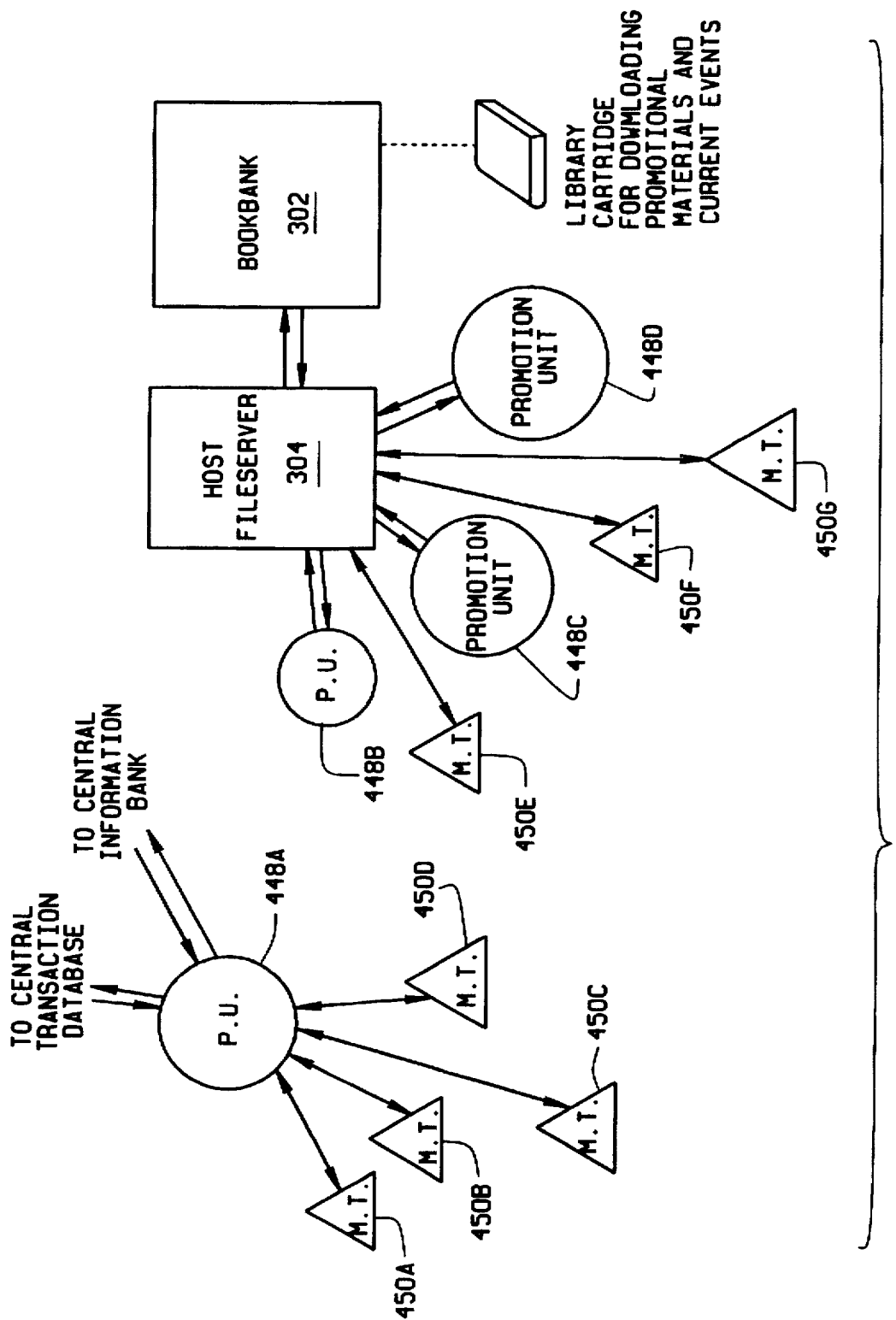
FIG. 11 is a block diagram illustration of certain elements of a promotional delivery system.

A promotional system in accordance with the present invention is illustrated in block diagram form in FIG. 11. As in the other point-of-sale systems, Book Bank 302 is networked to host fileserver 304. The promotional system further includes a number of promotional units 448A–D which electronically display and promote products. Unit 448A is coupled directly to central transactional data base 104 and central information bank 100 while units 448B–D are coupled to host fileserver 304. Unit 448A receives information from merchant terminals 450-A–D and host fileserver 304 receives information via merchant terminals 450E–G. More specifically, host fileserver 304 receives advertising and special offer updates from the local businesses, national or regional advertisers, and corporate sponsors through merchants terminals (MT) 450E–G. The host fileserver 304 is also networked to a central transaction data base which, in turn, provides a report to the publishers, advertisers, accounting, auditing firms, merchandise vendors, and others.

The promotional Book Bank allows selective downloading of promotional and commercial information to the user's point of rental media (see discussion in Section B, System Architecture, for explanation of such downloading) for the user's private review and personal shopping at his convenience. The promotional and the commercial information downloaded will self-destruct (i.e., automatically erase) at the expiration of a pre-determined time interval as explained above with respect to point of rental delivery systems. The promotional Book Bank also provides a user interactive self-service vending feature. The user may order products or information electronically via the network. Some of the promotional functions are: coupons on demand, virtual shopping, catalog sales, demos, subscription orders, electronic applications of credit cards, calling cards, or other types of services. Some public domain information distributed such as community events, ticket sales, institutional events or even public bulletins could also be distributed with the promotional information as a free or low cost service to the community.

The promotional and the commercial information flow is very similar to the information flow within the point-of-sale delivery system. However, rather than a publisher or copyright information owners, the information sources are local businesses, national or regional advertisers, and appropriate sponsors through advertising agents and other entities.

D. Encryption

The above-described point-of-sale delivery systems have the capability of performing dynamic encryption of data as the data is downloaded onto a user's storage media. Dynamic encryption refers to the process in which the Book Bank works together with the storage media to perform a proprietary encryption of downloaded data.

Figure 12:
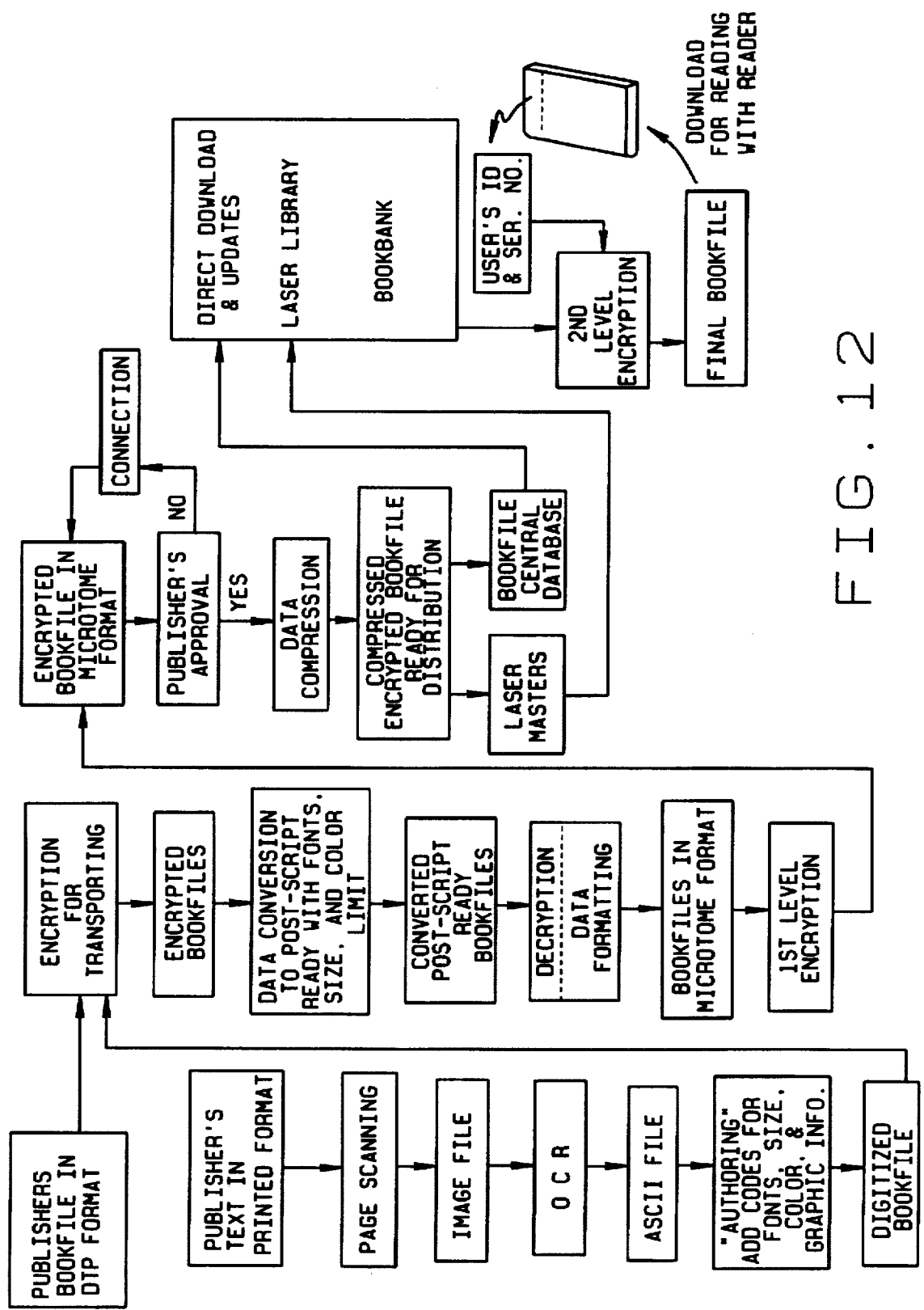
FIG. 12 is a flow chart illustrating the encryption process implemented in accordance with the present invention.

In addition to dynamic encryption, other encryption may be performed as illustrated in FIG. 12. FIG. 12 illustrates a three level encryption process. For example, prior to transmitting information on the network, the data may be encrypted. This facilitates preventing unauthorized users from accessing the transmitted data on the network. In addition to the pre-transport encryption, the data may be encrypted prior to being placed in a book bank. Publishers or other owners of the information may have approval authority over this level of encryption to provide such information owners with satisfaction that the data is adequately protected.

Once the data is stored in the book bank, dynamic encryption techniques may be used when downloading the data onto storage media. The storage media (FIG. 7) includes a proprietary environment for building, reading, viewing and processing. The media also has a commercial operating system environment for processing information files. An information file directory registry forms a part of the proprietary application, and a file directory pointer is contained in the operating system application.

The dynamic encryption process, in one form, uses the permanent serial numbers stored in the storage media, the user's personal identification number, and a password to further encrypt the data stored in the book bank as the data is downloaded to a user's storage media. The personalized variables and codings are combined with various individualized information file variables to form an individualized data structure for the data downloaded to the user's personalized media. As a result, those information files are individualized pertaining to the media, the version of software, the information file itself, and other variables.

The dynamic encryption assists in reducing the possibility of the unauthorized use of proprietary or other information by causing all information downloaded through the point-of-sale delivery system to be readable and accessible by a selected number of user readers/computers. Specifically, data storage medium accessible from one reader/computer will not be accessible using another reader/computer unless such access has been prearranged such as by providing the other reader/computer with an identical user identification number and password.

Examples of well-known encryption algorithms which may used in performing the above described three level encryption include the Z8068 Data Ciphering Processor (DCP). The DCP contains the structure to encrypt and decrypt data using National Bureau of Standards encryption algorithms. It may be used in a variety of environments including in dedicated controllers, communication concentrators, terminals and peripheral task processors in general processor systems. DCP provides a high throughput rate using cipher feedback, electronic code book or cipher block chain operating modes. The provisions of separate ports for key input, clear data and enciphered data enhances security. The host system communicates with the DCP using commands entered in the master port or through auxiliary control lines. Once set up, data can flow through the DCP at high speeds because input, output and ciphering activities can be performed concurrently.

With respect to dynamic encryption, the following describes one of many methods of dynamic encryption which could be uses. Particularly, each regularly used alpha or numeric symbol is assigned a corresponding number as illustrated in Table 1.

TABLE 1

| symbol | A  | B  | C  | D  | E  | F  | G  | H  | I  | J  | K  |
|--------|----|----|----|----|----|----|----|----|----|----|----|
| code   | 1  | 2  | 3  | 4  | 5  | 6  | 7  | 8  | 9  | 10 | 11 |
| symbol | L  | M  | N  | O  | P  | Q  | R  | S  | T  | U  | V  |
| code   | 12 | 13 | 14 | 15 | 16 | 17 | 18 | 19 | 20 | 21 | 22 |
| symbol | W  | X  | Y  | Z  | 0  | 1  | 2  | 3  | 4  | 5  | 6  |
| code   | 23 | 24 | 25 | 26 | 27 | 28 | 29 | 30 | 31 | 32 | 33 |
| symbol | 7  | 8  | 9  | .  | ,  | ;  | :  | +  | −  | x  |    |
| code   | 34 | 35 | 36 | 37 | 38 | 39 | 40 | 41 | 42 | 43 | 44 |

The serial number stored on the cartridge would be used to determine how many slots the code should shift to the left at the start the encrypting. For example, if the serial number ended with six, before starting of encryption, the code would be shifted to the left by six places. Table 2 illustrates the code table after the shift.

TABLE 2

| symbol | A  | B  | C  | D  | E  | F  | G  | H  | I  | J  | K  |
|--------|----|----|----|----|----|----|----|----|----|----|----|
| code   | 7  | 8  | 9  | 10 | 11 | 12 | 13 | 14 | 15 | 16 | 17 |
| symbol | L  | M  | N  | O  | P  | Q  | R  | S  | T  | U  | V  |
| code   | 18 | 19 | 20 | 21 | 22 | 23 | 24 | 25 | 26 | 27 | 28 |
| symbol | W  | X  | Y  | Z  | 0  | 1  | 2  | 3  | 4  | 5  | 6  |
| code   | 29 | 30 | 31 | 32 | 33 | 34 | 35 | 36 | 37 | 38 | 39 |
| symbol | 7  | 8  | 9  | .  | ,  | ;  | :  | +  | −  | x  |    |
| code   | 40 | 41 | 42 | 43 | 44 | 1  | 2  | 3  | 4  | 45 | 6  |

The selected user password then is used to determine after how many symbols the code should again shift to the left. As an example, if the password were ROSE, then using the codes from Table 2, the numeric statement for rose would be 24212511. When the corresponding numbers are added together until reaching a number between 1 and 10, the number reached in our example is 9 [18,9]. So after every 9th letter, the codes would be shifted another 6 spaces to the left. After the encrypting of 9 letters, the codes would be set as set forth in Table 3.

TABLE 3

| symbol | A  | B  | C  | D  | E  | F  | G  | H  | I  | J  | K  |
|--------|----|----|----|----|----|----|----|----|----|----|----|
| code   | 13 | 14 | 15 | 16 | 17 | 18 | 19 | 20 | 21 | 22 | 23 |
| symbol | L  | M  | N  | O  | P  | Q  | R  | S  | T  | U  | V  |
| code   | 24 | 25 | 26 | 27 | 28 | 29 | 30 | 31 | 32 | 33 | 34 |
| symbol | W  | X  | Y  | Z  | 0  | 1  | 2  | 3  | 4  | 5  | 6  |
| code   | 35 | 36 | 37 | 38 | 39 | 40 | 41 | 42 | 43 | 44 | 1  |
| symbol | 7  | 8  | 9  | .  | ,  | ;  | :  | +  | −  | x  |    |
| code   | 2  | 3  | 4  | 5  | 6  | 7  | 8  | 9  | 10 | 11 | 12 |

Because the fact that the encrypting tables are constantly shifting, under this simple method, the phrase—"My brown dog has fleas." would be encrypted as follows:

| 19 | 31 | 6  | 8  | 24 | 21 | 29 | 20 | 6  |
|----|----|----|----|----|----|----|----|----|
| 16 | 27 | 19 | 12 |    | 20 | 13 | 31 | 18 | 24 |
| 23 | 19 | 37 | 11 |    |    |    |    |    |

Decoding using only Table 1, the coded phrase would read as follows:

| S | 4 | F | H | X | U | 2 | T | F |
|---|---|---|---|---|---|---|---|---|
| P | 0 | S | L | T | M | 4 | R | X |
| W | S | . | K |   |   |   |   |   |

Without knowing other information, it would be very difficult to find a pattern that would allow one to decode the symbols.

Knowing the placement of the codes relative to the symbols at the start of the encryption process and the number of symbols between shifts, decoding an encrypted phrase is simply a reversal of the process applying each of the tables in reverse.

There are any number of similar methods of dynamic encryption which use a different manner of determining how encryption codes will vary as one proceeds through the data to be encrypted. The objective, of course, is to make decoding difficult by avoiding obvious patterns associated with conventional language and number usage.

While the present invention has been described with respect to specific embodiments, many modifications, variations, substitutions, and equivalents will be apparent to those skilled in the art. Accordingly, the invention is to be considered as limited only by the spirit and scope of the appended claims.

What is claimed is:

1. A system for providing information to electronic storage media of system users, said system comprising:

a central computer comprising a central information storage bank;

at least one local unit communicatively coupled to said central computer, said local unit comprising a memory for storing, in electronic form, information transmitted to said unit from said central computer, and a processor for controlling transfer of information stored in said unit to the electronic storage media of system users, said local unit configured to encrypt the information when the information is to be transferred to the electronic storage media.

2. A system in accordance with claim 1 wherein said local unit is configured to transmit, to said central computer, information related to a number of copies of an item of information transferred from said local unit to the electronic storage media.

3. A system in accordance with claim 1 wherein said local unit further comprises a memory interface configured to interface with the electronic storage media, and said local unit is further configured to utilize information stored on the electronic storage media to encrypt information transferred to the electronic storage media.

4. A system in accordance with claim 3 wherein the information stored on the electronic storage media comprises a personal signature code number and serial number.

5. A system in accordance with claim 1 wherein said local unit is further configured to transfer to the electronic storage media data which is indicative of a period of time during which access by the user of the information is authorized.

6. Apparatus for providing information from a central computer to a memory unit of a user, said apparatus comprising:

a first interface configured to be communicatively coupled to the central computer;

a book bank memory for storing, in electronic form, information transmitted to said first interface by the central computer;

a second interface configured to receive the user's memory unit;

a processor for controlling transfer of information stored in said book bank memory to the user's memory unit; and encryption means for dynamically encrypting information transferred through said second interface to the users' memory units.

7. Apparatus in accordance with claim 6 wherein the central computer includes a central transactional database and said apparatus further comprises a fileserver for controlling transmission, to the central transactional database, of information related to the number of copies of an item of information transferred through said second interface to the users' memory units.

8. Apparatus in accordance with claim 7 wherein said fileserver stores data related to the information transferred from said book bank memory to users' memory units in a manner so as to enable identification of each item of information transferred to each user's memory unit.

9. Apparatus in accordance with claim 6 wherein said processor is further configured to transfer to the user's memory unit data related to a time at which information is transferred from said book bank memory to the user's memory unit.

10. Apparatus in accordance with claim 6 wherein a personal signature code number and serial number are stored in the user's memory unit and wherein said encryption means is configured to read, through said second interface and from the user's memory unit, the personal signature code number and serial number.

11. A system for transferring information to storage media of system users, said system comprising:

a central information bank for storing electronic copies of information;

a central transactional database for storing data related to transactions;

at least one local unit comprising a first unit communicatively coupled to said central information bank for receiving information transmitted from said central information bank, said first unit further comprising a memory storage for storing information transmitted to said first unit by said central information bank, said local unit further comprising a fileserver coupled to said first unit for transmitting to said central transactional database information related to transactions performed by said first unit.

12. A system in accordance with claim 11 wherein said local unit is further configured to transfer to the system user storage media data indicative of a period of time during which access by the user to the information is authorized.

13. A system in accordance with claim 11 wherein said local unit is configured to perform at least some point-of-sale functions including transferring information received from said central information bank to the user storage media.

14. A system in accordance with claim 11 wherein said local unit is configured to perform at least some point-of-rental functions including transferring information received from said central information bank to the user storage media and transferring to the system user storage media data indicative of a period of time during which access by the user to the information is authorized.

15. A system in accordance with claim 11 wherein said local unit is configured to perform at least some subsystem functions including restricting duplication and transmission of data.

16. A system in accordance with claim 11 wherein said local unit is configured to perform at least some promotional delivery system functions including displaying promotional information.

17. A system in accordance with claim 11 wherein said local unit further comprises a memory interface configured to interface with the system user's storage media, and said local unit is configured to utilize information stored on said user's storage media to encrypt the information.

18. A system in accordance with claim 17 wherein the information stored on the user's storage media comprises a personal signature code number and serial number.

19. A system for providing information to electronic storage media of system users, said system comprising:
- a central computer comprising a central information storage bank;
- at least one local unit communicatively coupled to said central computer, said local unit comprising a memory for storing, in electronic form, information transmitted to said unit from said central computer, and a processor for controlling transfer of information stored in said unit to the electronic storage media of system users, said local unit configured to encrypt the information when the information is to be transferred to the electronic storage media, said local unit configured to encrypt the information utilizing information stored on said user's storage media.

20. A system in accordance with claim 19 wherein the information stored on the user's storage media comprises a personal signature code number and serial number.

21. A system in accordance with claim 19 wherein said local unit is configured to perform at least some point-of-sale functions including transferring information received from said central information bank to the user storage media.

22. A system in accordance with claim 19 wherein said local unit is configured to perform at least some point-of-rental functions including transferring information received from said central information bank to the user storage media and transferring to the system user storage media data indicative of a period of time during which access by the user to the information is authorized.

23. A system in accordance with claim 19 wherein said local unit is configured to perform at least some subsystem functions including restricting duplication and transmission of data.

24. A system in accordance with claim 19 wherein said local unit is configured to perform at least some promotional delivery system functions including displaying promotional information.

25. A system in accordance with claim 19 wherein said local unit is configured to transmit, to said central computer, information related to a number of copies of an item of information transferred from said local unit to the electronic storage media.

26. A system in accordance with claim 19 wherein said local unit is further configured to transfer to the electronic storage media data which is indicative of a period of time during which access by the user of the information is authorized.

27. Apparatus for providing transferring information to a memory unit of a user, said apparatus comprising:
- a book bank memory for storing, in electronic form, information which may be selected by the user for transfer to the user's memory unit;
- a memory unit interface configured to be coupled to the user's memory unit;
- a processor for controlling transfer of information stored in said book bank memory to the user's memory unit, said processor programmed to, for a first transaction, transfer information to the user's memory unit and, for a second transaction, transfer to the user's memory unit data indicative of a period of time during which access by the user to the information is authorized; and
- an encryption unit for dynamically encrypting information transferred through said memory unit interface to the user's memory unit, said encryption unit configured to encrypt the information, utilizing data stored on the user's memory unit, when the information is to be transferred to the memory unit.

28. Apparatus in accordance with claim 27 wherein said apparatus is part of a communications network including a central computer, said apparatus communicatively coupled to the central computer.

29. Apparatus in accordance with claim 28 wherein said apparatus is configured to transmit, to the central computer, information related to a number of copies of an item of information transferred from said apparatus to the user's memory unit.

30. Apparatus in accordance with claim 27 wherein the data stored on the user's memory unit comprises a personal signature code number.

* * * * *